May 3, 1938.   R. W. ROGERS   2,116,325
ORANGE JUICE EXTRACTOR
Filed July 10, 1936

INVENTOR
Robinson W. Rogers.
BY
J. Stuart Freeman,
ATTORNEY

Patented May 3, 1938

2,116,325

UNITED STATES PATENT OFFICE 2,116,325

ORANGE JUICE EXTRACTOR

Robinson W. Rogers, Orlando, Fla.

Application July 10, 1936, Serial No. 89,950

2 Claims. (Cl. 146—3)

The object of the invention is to provide broadly an extractor for the juices of various types of fruit, such as those of the citrus group, and especially the orange, grapefruit, tangerine and lemon.

Another object is to provide an extractor, which by preference is designed to be used with a whole fruit, as in that case the rind functions to retain the pulp and skin acid. It will, of course, extract the juice from a half fruit, but the rind in such case cannot function to prevent at least a portion of the pulp and skin acid from being discharged by the device into a receptacle therebeneath.

A further object is to provide a juice extractor, which serves to laterally sever the core and seeds from the surrounding portions of the fruit, and thereafter to compress the juice from such central portion, without permitting either severed portion or seeds leaving the extractor with the juice squeezed therefrom.

Still another object is to provide a device of this character, which is so formed as to normally cooperate with the upper edge of an ordinary drinking glass, to operatively center the former with respect to the latter, and thereby insure the passage of all of the extracted juice into the glass, while in an inverted position the extractor nests within such a glass, and extends but slightly beyond the same radially.

And a still further object is to provide such a device in a form of construction, which is especially adapted to permit its being formed or molded or pressed from glass, to which an annular metallic cutting element is secured, to serve as the means for initially separating the core and closely adjacent seed-containing portions from the surrounding juice-containing portions.

Figure 1:
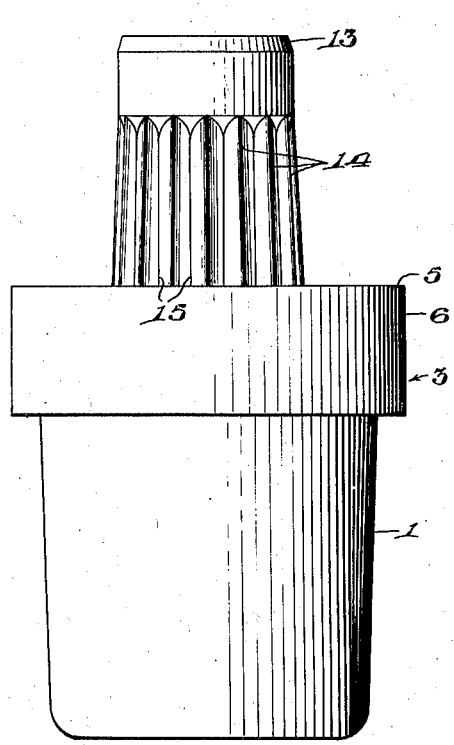
Figure 2:
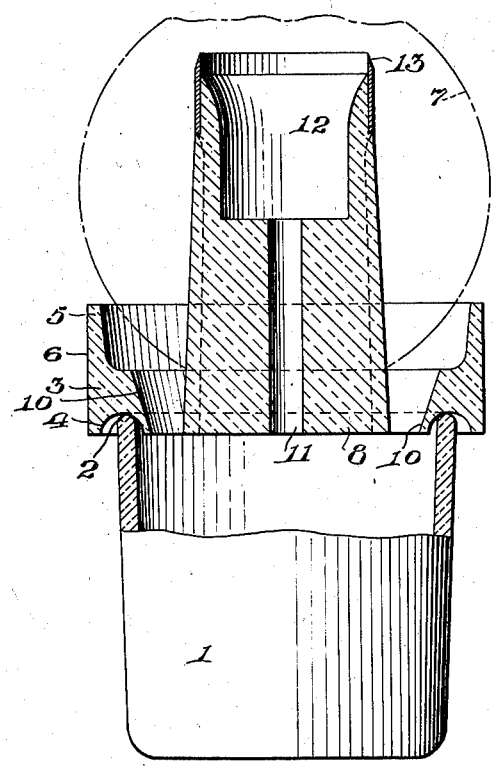
Figure 3:
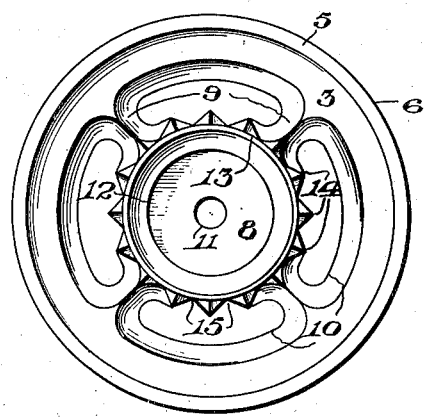
Figure 4:
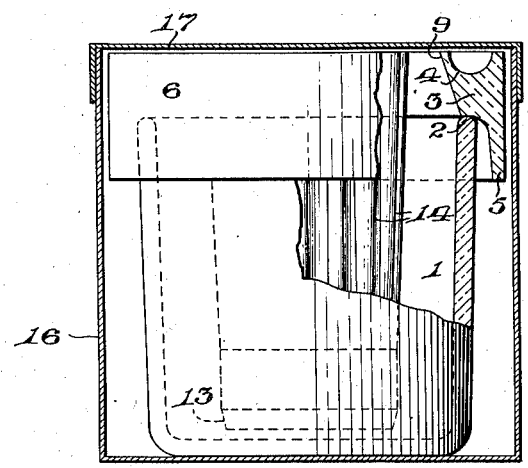

With these and other objects in mind, the invention comprises further details of construction, which are hereinafter brought out in the following description, when read in conjunction with the accompanying drawing, in which Fig. 1 is an elevational view of the juice extractor comprising one embodiment of the invention, operatively positioned upon a suitable drinking glass or similar type of vessel; Fig. 2 is a vertical diametrical section of the former and a portion of the latter, with an orange indicated thereon by means of dot-and-dash lines; Fig. 3 is a top plan view of the extractor; and Fig. 4 is a view showing the extractor in inverted position with respect to the vessel, and the two in nested relation being positioned within a protective container, which latter is shown in cross-section.

Referring to the drawing, the vessel 1 is shown as being of relatively shallow depth and comprising an upper annular edge 2, but is understood to be merely illustrative of any shape, size, or type of vessel which may be adapted for operative association with the improved extractor, as hereinafter described.

The extractor itself, when in operative position, as shown in Figs. 1 and 2, comprises an annular body portion 3, the radially outer portion of the under surface of which is provided with an annular groove 4, which is here shown as being of substantially semi-circular cross-section and adapted to receive the upper edge portion 2 of the vessel 1. Said body portion also comprises an annular, upwardly extending flange 5 which, when the device is in inverted position, surrounds the upper edge of said vessel, as shown in Fig. 4, and prevents any substantial movement of the extractor laterally with respect to the vessel. This flange also serves to provide an outer, manually engageable surface 6, by which the extractor may be held with one hand, while the orange 7 (or other fruit) is held by the other hand.

A central portion 8 of the device is integrally connected to the body portion 3 by means of spaced ribs 9, which provide circumferentially spaced apertures 10, through which the major portion of the juice extracted from the orange progresses downwardly and into the vessel 1. Said central portion 8 is provided with an axial bore 11, which leads downwardly from an upwardly positioned concentric recess or cavity 12, the sides of which preferably flare outwardly and merge gradually with the inner surface of an annular, metallic cutting element 13, said cutting element preferably being formed of stainless steel, or similar metal, and unitarily secured by any suitable means to the uppermost central portion of the extractor, which latter otherwise is preferably formed of molded, pressed, or cast vitreous material, such as glass or even glazed porcelain, or the like.

The outer surface of the central portion 8 preferably increases slightly in diameter downwardly, and is provided with circumferentially spaced ridges 14 and intervening grooves 15 to provide an abrading surface to facilitate the extraction of the juice of the orange, as the latter is squeezed radially against such surface, while being revolved or oscillated angularly with respect thereto.

In the operation of this device, a whole orange is initially placed with either its stem or blossom connection centrally positioned within the annular cutting element 13. As the orange is rotated, while being pressed downwardly, said cutting element penetrates the orange in such manner that the core and adjacent seed supporting portion enter the cavity 12 and become compressed axially upwardly therein, since the maximum depth of said cavity is considerably less than the vertical diameter of the orange. The juice squeezed during such compression on this central portion of the orange will obviously pass freely downwardly through the bore 11, and drop into the vessel 1.

The outer portion of the orange, having reached substantially the position indicated by the dot-and-dash lines 7 in Fig. 2, is then rotated while being squeezed against the vertical ridges 14, thereby forcing the juice from such surrounding portion of the orange downwardly through the grooves 15 and apertures 10, whence it also drops into the vessel 1.

During this operation it will be evident that practically all, if not every portion of the pulp of the orange will be retained within the surrounding skin, rind, or case, while the core and seeds are simultaneously squeezed and retained within the cavity 12, with the result that no subsequent straining of the juice within the vessel 1 is necessary.

Additional advantages of the improved extractor comprise the fact that it eliminates all skin acid being extracted with the internal juice; the device is completely sanitary, especially when made of glass or other vitreous substance; it is easy and entirely practical to operate, as well as being inexpensive to manufacture and economical in general use; it is designed to fit any regular size of glass or so-called tumbler; extracts a maximum portion, if not all, of the juice of the orange, and the juice only; the cutting element, when made of stainless steel or similar material, is rustless, clean and, therefore as sanitary as the vitreous portion of the device; the device provides for the efficient compression of the central or core portion of an orange, without breaking or causing portions of the core and seeds to enter the vessel below; the central bore 11 eliminates air compression as the fruit is pressed downwardly and also permits the free flow of juices downwardly from the cavity 12; the exterior grooves 15 permit the juice to flow freely as the intervening ridges cause its removal from the radially outer portion of the fruit, the exact shape, depth, and arrangement of said grooves and ridges being subject to various alterations as to details of design, depending upon the preference of the manufacturer; the device permits it to be nested with respect to a vessel so that the two can be shipped and/or stored within a suitable form of cylindrical container 16, with removable top 17, as shown in Fig. 4; the apertures 10 permit the ready flow of juice into the vessel and may be of different shape and number than as shown in the drawings, as said apertures in this case do not have to provide for separating seeds from juice, as in many devices of this character; the tapered shape of the central portion permits the orange skin, pulp, core and seeds to be removed readily as soon as all possible juice has been extracted from the fruit, while the bore 11 permits air to enter the bottom of the recess 12, and thereby permit the ready removal of the compressed core and seed portion therefrom; the device is extremely easy to clean, as a result of its simple construction; while its manually engageable, radially outer surface 6 presents an area which is admirably suitable for advertising indicia.

Having thus described my invention, what I claim as new and desire to protect by Letters Patent of the United States is:—

1. A fruit juice extractor, comprising a central, imperforate, upwardly extending, vitreous portion having a substantially cylindrical external surface provided with longitudinally extending substantially parallel ridges, and with a centrally positioned radially large, substantially cylindrical cavity adapted to receive a fruit core, pulp and seeds, and said cavity having a restricted drainage bore, to prevent such fruit core, pulp and seeds escaping from said cavity downwardly, a cylindrical cutting element carried by the outer end of said central portion and surrounding said cavity, the entrance of which cavity tapers inwardly from said cutting element, and an annular apertured flange adapted to rest upon a vessel, in turn adapted to receive juice through said bore and the apertures of said flange.

2. A fruit juice extractor, comprising a base in the form of an artillery wheel, an up-standing core reaming cylindrical portion arising centrally therefrom, said cylindrical portion having an imperforate longitudinally grooved outer wall surface, a cylindrical cutter mounted upon the normal upper end of the cylindrical portion and surrounding a cavity formed therein, a drainage passage leading from the cavity through the lower end of the cylindrical portion, and a groove in the normal lower side of the rim of the wheel-like base, to fit the upper edge of a tumbler.

ROBINSON W. ROGERS.